United States Patent
Sriti

Patent Number: 5,862,407
Date of Patent: Jan. 19, 1999

[54] SYSTEM FOR PERFORMING DMA BYTE SWAPPING WITHIN EACH DATA ELEMENT IN ACCORDANCE TO SWAPPING INDICATION BITS WITHIN A DMA COMMAND

[75] Inventor: Mohammed Sriti, Milpitas, Calif.

[73] Assignee: Rendition, Inc., Mountain View, Calif.

[21] Appl. No.: 616,594

[22] Filed: Mar. 15, 1996

[51] Int. Cl.$^6$ .............................. G06F 9/22; G06F 9/315
[52] U.S. Cl. ........................ 395/843; 395/842; 395/853; 395/885; 711/201
[58] Field of Search .................................. 395/842, 800, 395/847, 280, 307, 162, 500, 474, 843, 853, 885; 345/441, 501; 711/147, 201, 155

[56] References Cited

U.S. PATENT DOCUMENTS

| | | | |
|---|---|---|---|
| 4,447,878 | 5/1984 | Kinnie et al. | 395/307 |
| 5,168,561 | 12/1992 | Vo | 395/842 |
| 5,170,477 | 12/1992 | Potter et al. | 711/201 |
| 5,214,777 | 5/1993 | Curry, Jr. | 711/155 |
| 5,265,237 | 11/1993 | Tobias et al. | 395/500 |
| 5,317,715 | 5/1994 | Johnson et al. | 395/842 |
| 5,428,741 | 6/1995 | Ho et al. | 345/501 |
| 5,530,835 | 6/1996 | Vashi et al. | 711/147 |
| 5,559,969 | 9/1996 | Jennings | 395/307 |
| 5,561,820 | 10/1996 | Bland et al. | 395/847 |
| 5,581,711 | 12/1996 | Takeshige | 395/280 |
| 5,594,854 | 1/1997 | Baldwin et al. | 345/441 |
| 5,619,728 | 4/1997 | Jones et al. | 395/847 |

*Primary Examiner*—Le Hien Luu
*Attorney, Agent, or Firm*—Blakley, Sokoloff, Taylor & Zafman LLP

[57] ABSTRACT

An apparatus and method for performing byte swapping using a direct memory access (DMA) controller is provided. In a computer system, a DMA controller for a peripheral component is coupled to system memory via a bus. The DMA controller receives a command pointer to initiate a memory access operation. The command pointer specifies the location of the first DMA command in a command list to be executed by the DMA controller. Each DMA command includes an address word giving the starting address and length word indicating the number of data words to be accessed in memory. Because the data stored in memory is double-word aligned, the two least significant bits of the length word are not needed to perform the memory access and are instead used to indicate any byte swapping that is to be performed on the data during the memory access. During a memory access, the DMA controller swaps the bytes in each double-word of data as specified by the two least significant bits of the length word.

22 Claims, 7 Drawing Sheets

| $L_1$ | $L_0$ | DESCRIPTION | | | | |
|---|---|---|---|---|---|---|
| 0 | 0 | NO SWAP | $B_3$ | $B_2$ | $B_1$ | $B_0$ |
| 0 | 1 | $B_3 \leftrightarrow B_0, B_2 \leftrightarrow B_1$ | $B_0$ | $B_1$ | $B_2$ | $B_3$ |
| 1 | 0 | $B_3 \leftrightarrow B_2, B_1 \leftrightarrow B_0$ | $B_2$ | $B_3$ | $B_0$ | $B_1$ |
| 1 | 1 | $B_3 \leftrightarrow B_1, B_2 \leftrightarrow B_0$ | $B_1$ | $B_3$ | $B_0$ | $B_2$ |

SYSTEM FOR PERFORMING DMA BYTE SWAPPING WITHIN EACH DATA ELEMENT IN ACCORDANCE TO SWAPPING INDICATION BITS WITHIN A DMA COMMAND

FIELD OF THE INVENTION

The present invention pertains to the field of computer systems. More particularly, the present invention relates to performing byte swapping during data transfers in a computer system.

BACKGROUND OF THE INVENTION

Computer systems generally operate upon binary data items that are anywhere between one and eight bytes in length, where a "byte" is defined as eight bits. Typically, the smallest data item that a modern computer system will operate on is either a "word", which is two bytes, or a "double-word" ("dword"), which is four bytes. For various different reasons, it is sometimes necessary or desirable to alter the order of bytes within a word or dword data item. This operation is known as "byte swapping". One possible reason byte swapping may be desirable, for example, is to switch back and forth between different methods of addressing data, such as between "little-endian" addressing, in which a memory address refers to the lowest-order byte of a data item, and "big-endian" addressing, in which an address specifies the highest-order byte of a data item.

In existing computer systems, byte swapping is generally performed by the host processor in response to software commands. Consider, for example, a common situation in which data stored in a block of memory is to be transferred to a new location (i.e., a different location in memory or a peripheral device) and in which byte swapping is required. The host processor would typically read the data from the memory, rearrange the bytes, and then write back the rearranged data words to the first block of memory. Then, the host would write the modified data words into the new location. This method has the disadvantage of being time-consuming, because the host processor must write back the modified data before transferring the data to the new location. Hence, what is needed is a faster and more efficient way to perform byte swapping during memory access operations.

SUMMARY OF THE INVENTION

An apparatus for performing memory access operations upon a memory is provided. The apparatus comprises a direct memory access (DMA) controller coupled to a bus interface. The bus interface provides a connection to a bus, to which a memory is also coupled. During a memory access operation, the DMA controller accesses data words stored in the memory, wherein each data word includes at least two bytes, and swaps the bytes of at least one of the data words according to a control input.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing direct memory access (DMA) byte swapping is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
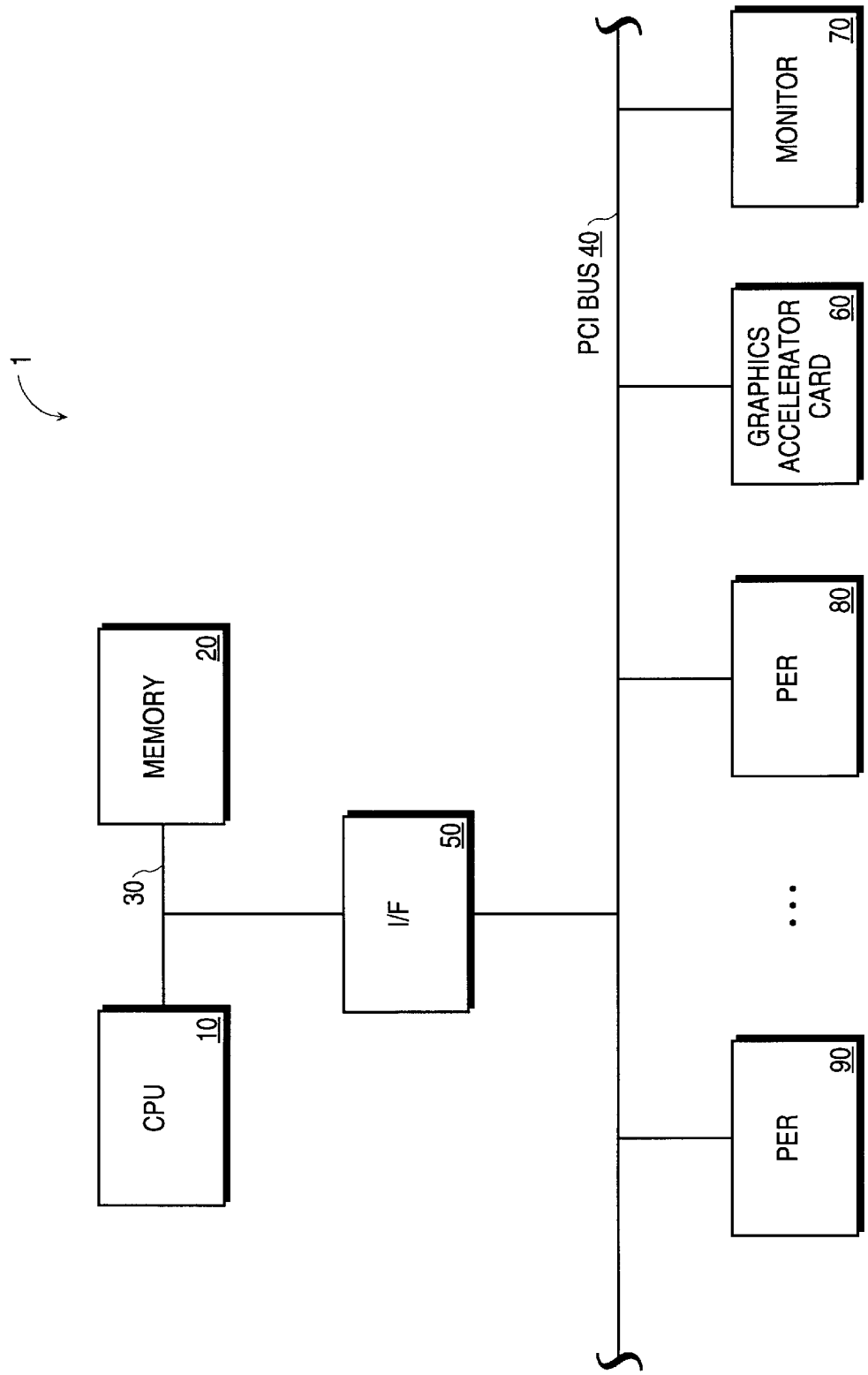
FIG. 1 illustrates a computer system in which the present invention is implemented.

FIG. 1 illustrates a computer system 1 in which the present invention is implemented. The computer systems includes a central processing unit (CPU) 10 coupled to a memory 20 by a system bus 30. The system bus 30 is coupled to a PCI (peripheral component interconnect) bus 40 by a bus interface 50. Coupled the PCI bus 40 are a graphics accelerator card 60, which is coupled to a monitor 70, as well as a number of other peripheral devices 80 and 90. The present invention is implemented within graphics accelerator card 60.

Figure 2:
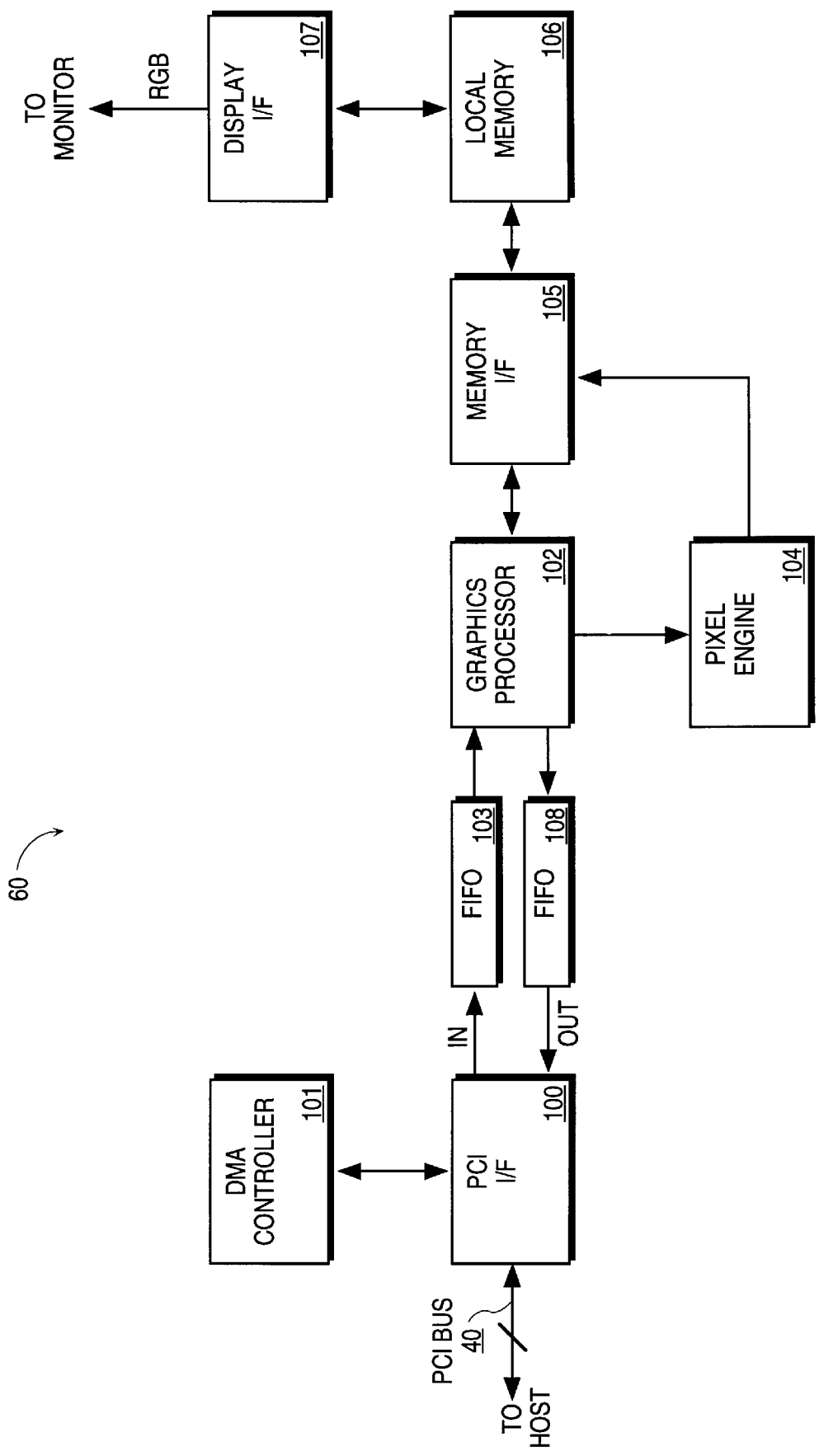
FIG. 2 illustrates circuitry on a graphics accelerator card in the computer system of FIG. 1.

FIG. 2 illustrates the graphics accelerator card 60 is shown in greater detail. Graphics accelerator card 60 includes a graphics processor 102, which is designed to control and perform various graphics functions. Graphics processor 102 is coupled to a local memory 106 through a memory interface 105 and to a pixel engine 104. Local memory 106 includes a frame buffer for storing pixel color values that are to be displayed on the monitor 70. Color values stored in the frame buffer are provided to the monitor in the form of RGB (red, green, blue) analog signals via display interface 107. The graphics accelerator card 60 is coupled to the PCI bus 40 by a PCI interface 100. A direct memory access (DMA) controller 101, which is coupled to PCI interface 100, controls DMA operations performed on any memory within the computer system 1, such as main memory 20, that are required to support operation of card 60. Information received by the graphics accelerator card 60 over PCI bus 40 is provided to the graphics processor via an input FIFO 103, while information to be output onto the PCI bus 40 by the graphics processor 102 is provided to the PCI interface 100 via an output FIFO 108.

Figure 3:
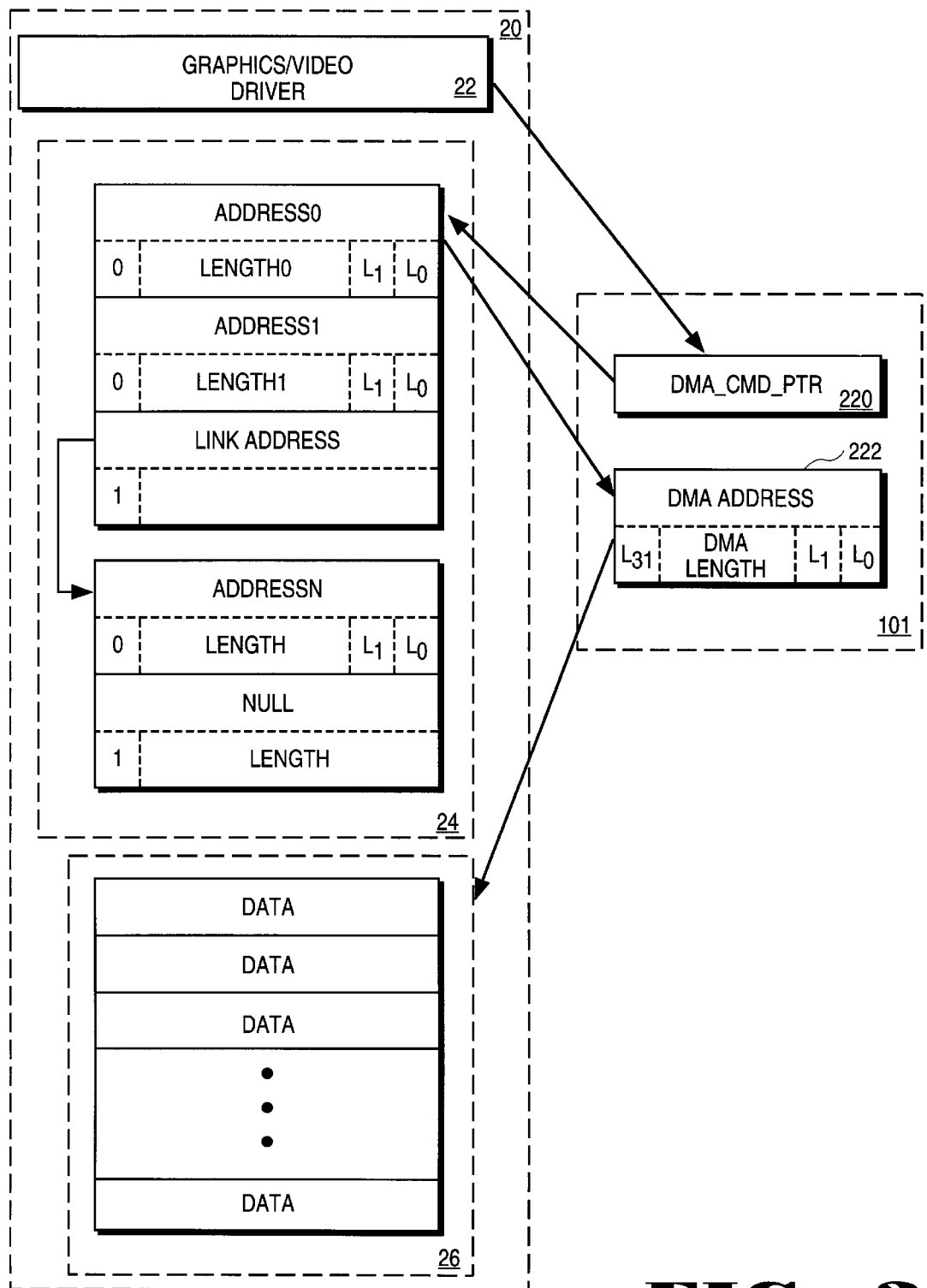
FIG. 3 illustrates control flow between a DMA controller and a host system during a DMA operation.
Figures 4A, 4B:
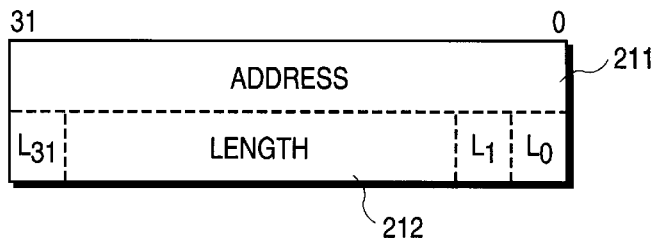
FIG. 4A illustrates a direct memory access (DMA) command pair.
FIG. 4B is a table illustrating a byte swapping scheme.

In the present invention, byte swapping is performed by DMA controller 101 under the control of a state machine in the PCI interface 100. The DMA controller is a PCI bus master which executes DMA operations that are specified by command pairs in a chained DMA command list. FIG. 3 illustrates an example of a chained command list 24, which is stored in memory 20. The command list 24 is generated by graphics driver software 22 supporting the graphics accelerator card 60 and is also stored in memory 20. Each DMA command pair consists of an Address field in the even dword and a Length field in the odd dword. FIG. 4A illustrates a DMA command pair, including Address field 211 and Length field 212. The Address field provides a word-aligned physical byte address of either: 1) the first dword of data in the data array 26 that is to be accessed for that command, or 2) the (link) address of the next DMA command to be executed. The Length field specifies the size of the DMA transfer when the Address field specifies an address in the data array 26. The most significant bit of the Length field, bit $L_{31}$, is used to indicate whether the address specifies the location of data or a link to another DMA command. Specifically, a value of 1 for bit $L_{31}$ indicates that the Address field specifies a link to another DMA command.

Data stored in memory 20 is dword-aligned; consequently, bits $L_0$ and $L_1$ of each DMA command are not required for addressing data. Therefore, the two least significant bits of the Length field, bits $L_0$ and $L_1$ (where $L_0$ is the least significant bit), are used in the present invention to indicate the byte swapping scheme for a memory access. For each DMA command, the values of bits $L_0$ and $L_1$ are set by the graphics driver software 22 based on the graphics requirements of whatever application software is currently running in the computer system 1. Note that bits $L_0$ and $L_1$ are ignored if bit $L_{31}$ is set to 1, since the Address field specifies a link to another DMA command in such cases.

FIGS. 4A and 4B illustrate how DMA commands are used to implement a byte swapping scheme. Referring again to FIG. 4A, a DMA command consists of an Address field 211 and a Length field 212. The Length field 212 includes the bit pair '$L_1L_0$'. The value of bit pair '$L_1L_0$' determines the byte swapping scheme, as shown in FIG. 4B. In the preferred embodiment, each data item is a dword consisting of four bytes, $B_0$ through $B_3$, where byte $B_0$ is the lowest order byte and byte $B_3$ is the highest order byte. During a DMA operation, if the value of '$L_1L_0$' is 00, then no byte swapping is performed. If the value of '$L_1L_0$' is 01, then bytes $B_0$ and $B_3$ are swapped and bytes $B_1$ and $B_2$ are swapped. If the value of '$L_1L_0$' is 10, then bytes $B_2$ and $B_3$ are swapped and bytes $B_0$ and $B_1$ are swapped. If the value of '$L_1L_0$' is 11, then bytes $B_1$ and B3 are swapped and bytes $B_0$ and $B_2$ are swapped.

FIG. 3 illustrates the control flow during a DMA operation. As shown in FIG. 3, the DMA controller 101 includes a DMA command pointer register 220 and a DMA command register 222. The DMA command pointer register 220 stores the physical byte address of the current DMA command pair. The DMA command register 222 holds the values of the DMA command pair currently being executed. A DMA operation is initiated by the graphics driver 22 writing the address of the first DMA command of the DMA command list to the DMA command pointer register 220. When the address of the first DMA command pair is written to the DMA command pointer register 220, the DMA controller 101 begins executing DMA commands (i.e., command pairs) in the chained DMA command list 24. A null value in the Address field terminates the DMA operation. Each time a DMA command is completed, the value in the DMA command pointer register 220 is incremented by eight bytes to correspond to the byte location of the next DMA command pair.

Figure 5:
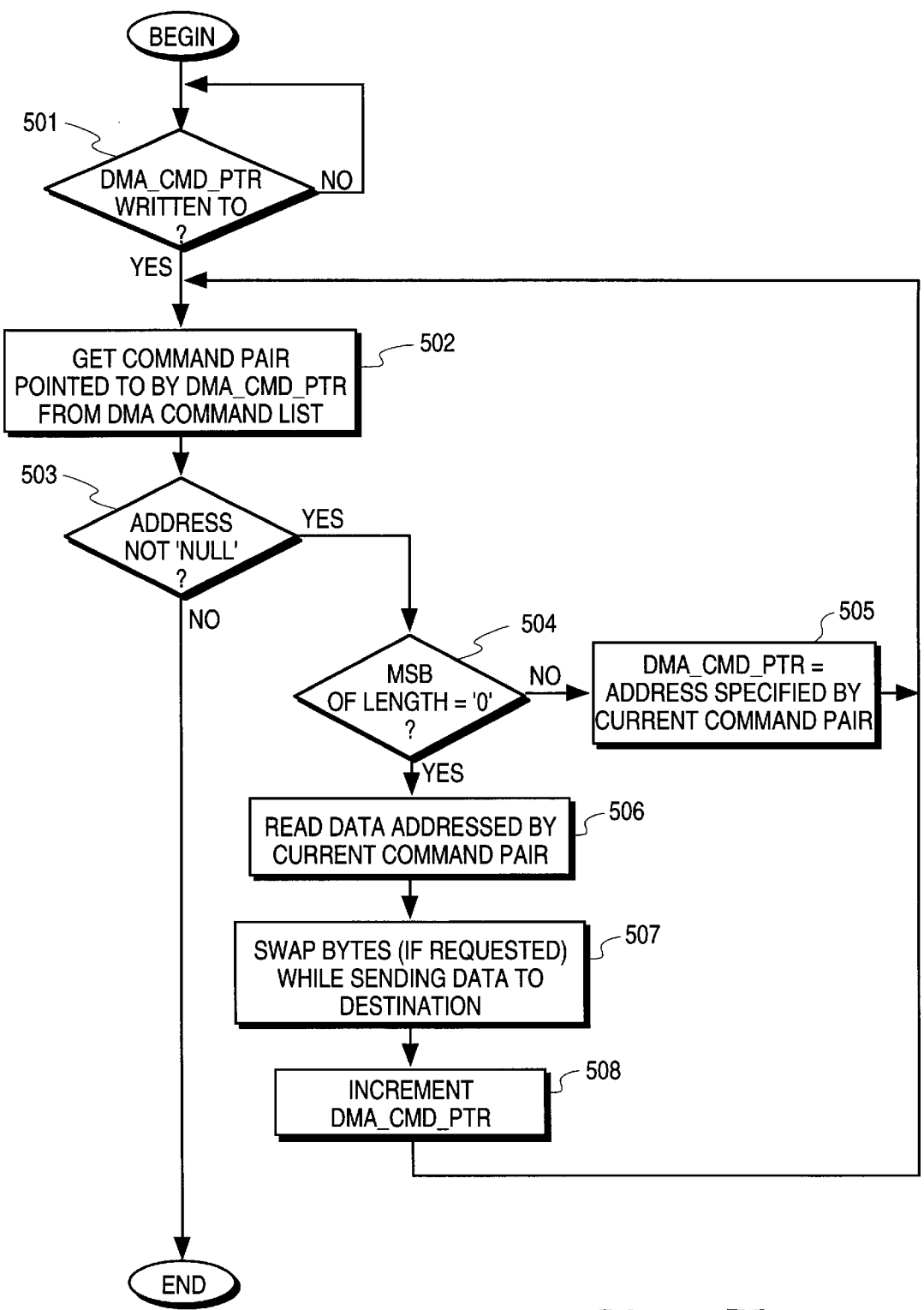
FIG. 5 is a flow diagram illustrating a technique for performing DMA byte swapping.

Referring now to FIG. 5, the method of operation of the present invention is described. The DMA controller 101 first checks the DMA command pointer register 220 to determine if an address of a DMA command pair has been written to the register 200 (step 501). If an address has been written to the DMA command pointer register 220, then the DMA controller 101 gets from the command list the DMA command pair pointed to by the DMA command pointer register 220 and stores that command pair in register 222 (step 502). A determination is then made (step 503) as to whether the value of the Address field of the current DMA command pair is null. If the value of the Address field is null, then the operation is terminated. If the value is not null, then bit $L_{31}$ of the Length field is examined (step 504). If bit $L_{31}$ is 1 (i.e., the Address field specifies a link to the next DMA command pair), then the DMA controller 101 replaces the value in the DMA command pointer register with the link address specified by the Address field (step 505) and replaces the contents of the DMA command register 222 with the command pair at the link address (step 502). If bit $L_{31}$ is 0 (i.e., the Address field specifies an address in the data array 26), then the DMA controller reads the data addressed by the current DMA command (step 506) and swaps the bytes within each dword of data according to bits $L_0$ and $L_1$ of the current Length field (step 507). Byte swapping occurs as each data item (dword) is transferred from memory 20 to graphics accelerator card 60. Upon completion of the current DMA command, the DMA command pointer register 220 is incremented once again by eight bytes (step 508) in order to load the next command pair.

Figure 6:
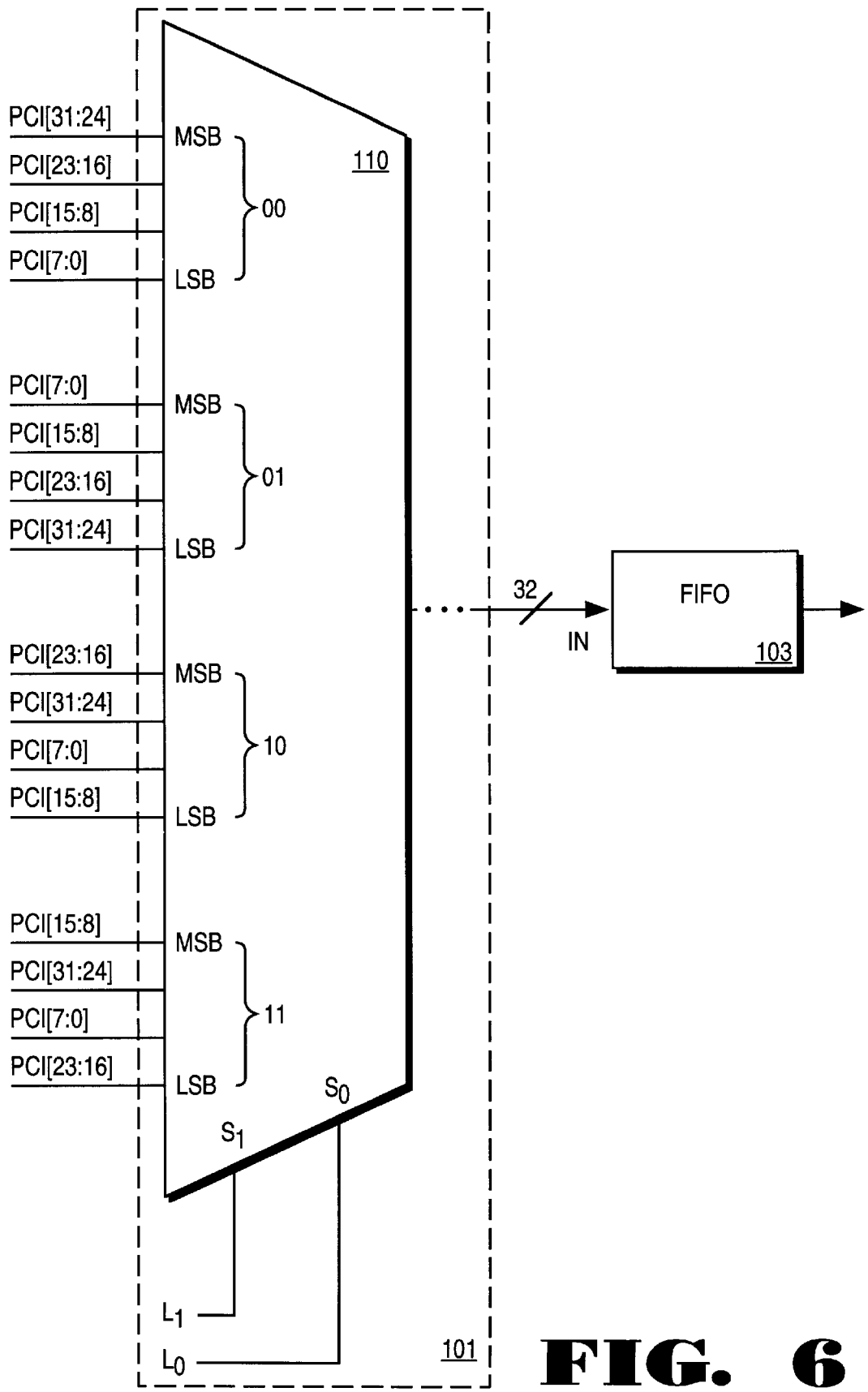
FIG. 6 illustrates circuitry in a DMA controller for performing DMA byte swapping during memory read operations.

FIG. 6 illustrates circuitry for implementing DMA byte swapping as described above. The DMA controller 101 includes a multiplexor 110 having inputs coupled to the PCI bus 40 and an output which is provided to FIFO 103 via the PCI interface 100. Multiplexor 110 has four inputs which are selected based on bits $L_0$ and $L_1$ of the Length field of the current DMA command. Each input of multiplexor 110 receives the same 32 bit lines from the PCI bus 40. However, the arrangement of the bit lines is different for each input and corresponds to one of the four byte swapping formats described with reference to FIG. 4B. For example, each bit position applied to input '00' (selected if no byte swapping is requested) receives the corresponding bit position of the PCI bus 40; however, for input '01', the eight least significant bit positions receive bits 24 through 31 of the PCI bus (i.e., PCI[31:24]), and the eight most significant bit positions of input '01' receive bits 0 through 7 of the PCI bus 40 (i.e., PCI[7:0]).

Figure 7:
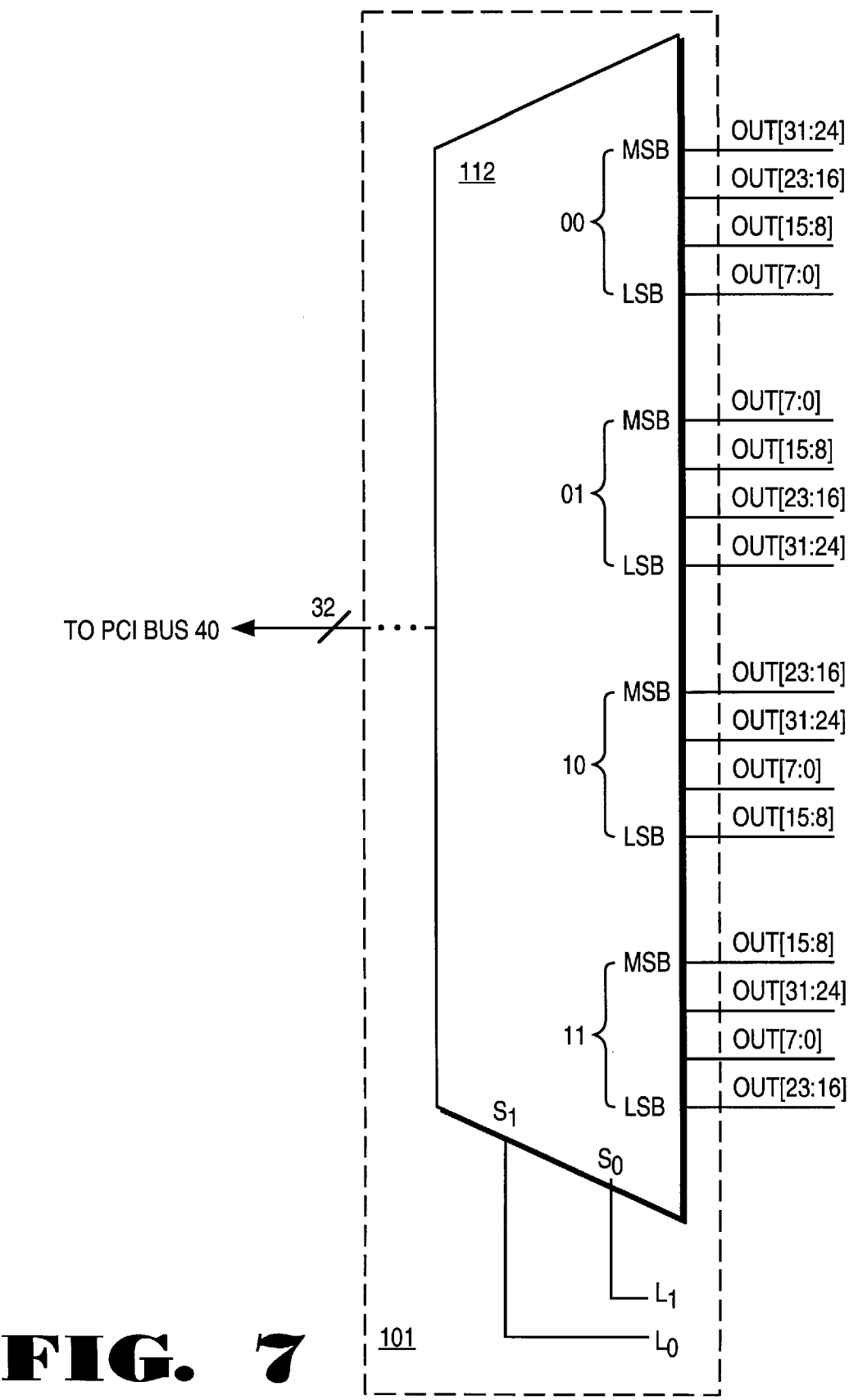
FIG. 7 illustrates circuitry in DMA controller for performing DMA byte swapping during memory write operations.

Although the preferred embodiment provides means for performing byte swapping during a memory read operation, memory write operations can also be performed within the scope of the present invention. FIG. 7 shows circuitry in an embodiment capable of performing DMA byte swapping during memory write operations. In the embodiment of FIG. 7, a second multiplexor 112 is provided within the DMA controller 101. Multiplexor 112 receives four 32-bit inputs, each from output FIFO 108. The ordering of the bit lines for each input is arranged according to one of the four byte swapping formats illustrated in FIG. 4B, as explained with respect to FIG. 6. Multiplexor 112 provides one 32-bit output to PCI bus 40. Selection of the four inputs of multiplexor 112 is again determined by the values of bits '$L_1L_0$' of the current DMA command.

It should be appreciated that the use of multiplexors such as those illustrated in FIGS. 6 and 7 is only one possible way of implementing byte swapping within a DMA controller. Other ways of selecting byte ordering within a DMA controller may be utilized within the scope of the present invention.

Thus, a method and apparatus for performing DMA byte swapping has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for performing memory access operations upon a memory, the apparatus comprising:

an interface providing a connection to a communication medium, the communication medium coupled to the memory; and a controller coupled to the interface, the controller accessing data elements stored in the memory according to a command indicating a memory access operation, each of the data elements including at least a first portion and a second portion, the controller swapping the first and second portions within at least one of the data elements during a memory access operation according to a swapping indication within the command.

2. An apparatus according to claim 1, wherein the command includes a length portion indicating a number of data elements to be read from or written to the memory, the length portion including the swapping indication.

3. An apparatus according to claim 1, wherein the command is a DMA command.

4. A direct memory access (DMA) controller for controlling memory access operations upon a memory, the DMA controller comprising:

register means for receiving and storing at least one DMA command from a set DMA commands, each of the DMA commands specifying one of a plurality of memory access operations, each of the at least one DMA commands including at least one byte swapping bit; and swapping means for receiving a data item read from or to be written to the memory, the data item including a plurality of bytes, the swapping means for swapping bytes in the data item according to the at least one byte swapping bit.

5. A DMA controller according to claim 4, wherein the swapping means comprises multiplexor means for selecting one of a plurality of inputs according to the at least one byte swapping bit, each of the inputs corresponding to one of a plurality of possible byte swapping patterns, the multiplexor means further for outputting a modified data item having swapped bytes.

6. A DMA controller according to claim 4, wherein the data item is a double-word of data.

7. A DMA controller according to claim 4, wherein the DMA command comprises a length field specifying a number of data items to be read from or written to the memory, the length field including the at least one byte swapping bit.

8. A direct memory access (DMA) controller for controlling memory access operations performed upon a memory, the DMA controller comprising:

a command register receiving and storing a DMA command, the DMA command including an address portion and a length portion, the length portion including a plurality of signal bits designating a byte swapping operation; and a multiplexor coupled to receive the signal bits and coupled to receive a data word read from the memory at any of a plurality of inputs, the data word including a plurality of bytes, each of the inputs corresponding to the data word according to a different possible byte order, the multiplexor selecting one of the inputs according to the signal bits and outputting a modified data word having swapped bytes.

9. A DMA controller according to claim 8, wherein the data item is a double-word of data consisting of thirty-two (32) bits.

10. A DMA controller according to claim 8, wherein the length portion specifies a number of data items to be read from or written to the memory.

11. In a processing system having a host processor, a memory coupled to the host processor, and a peripheral component coupled to the host processor and to the memory, the peripheral component including a direct memory access (DMA) controller, a method of swapping bytes of data words read from or to be written to the memory, the method comprising the steps of:

providing a DMA command to the DMA controller, the DMA command for performing a DMA memory access and including a signal bit designating a byte swapping pattern;

using the DMA controller to read a data word from the memory in response to the DMA command, the data word including a plurality of bytes;

using the DMA controller to rearrange the bytes of the data word read from the memory based on the signal bit to form a modified data word for use by the peripheral component.

12. A method according to claim 11, wherein the step of providing the DMA command to the DMA controller comprises the step of providing an address and a length indication to the DMA controller, the length indication indicating a number of data words to be read from the memory.

13. A method according to claim 12, wherein the length indication includes the signal bit.

14. A method according to claim 13, wherein the address specifies portions of the memory which are double-word aligned.

15. A method according to claim 11, wherein the step of using the DMA controller to rearrange the bytes of the data word read from the memory comprises the step of multiplexing a plurality of inputs, each input corresponding to the data word according to a different possible byte order.

16. In a direct memory access (DMA) controller, a method of performing DMA operations, the method comprising the steps of:

inputting a DMA command, the DMA command indicating a data element to be read from or written to a memory, the data element including a first portion and a second portion, the DMA command further indicating a swapping scheme;

inputting the data element; and swapping the first and second portions of the data element according to the swapping scheme.

17. A method according to claim 16, wherein the step of inputting a DMA command comprises the step of inputting a DMA command having an address field and a length field, at least a portion of the length field designating the swapping scheme.

18. A method according to claim 17, wherein the step of swapping comprises the steps of:

generating a plurality of versions of the data element, each version representing the data element according to one of a plurality of possible swapping schemes; and outputting one of the versions as modified data element according to the swapping scheme designated by the DMA command.

19. In a direct memory access (DMA) controller associated with a peripheral device, a method of performing DMA operations, the method comprising the steps of:

receiving a location of a DMA command;

in response to receiving the location, accessing the DMA command, the DMA command including an address portion and a length portion, the DMA command indicating a plurality of data words to be read from a memory, each of the data words including a plurality of bytes, the DMA command including a plurality of bits designating a byte swapping operation to be performed upon the data words;

reading the data words from the memory; and rearranging the bytes within the data words according to the byte swapping scheme while providing the data words to the peripheral device.

20. A method according to claim 19, wherein the step of rearranging the bytes of the data words comprises the steps of:

generating a plurality of versions of each of the data words, each version representing the data word according to one of a plurality of possible byte swapping operations; and outputting one of the versions as modified data word according to the byte swapping operation designated by the DMA command.

21. A method according to claim 20, wherein the length portion of the DMA command includes the plurality of bits designating the byte swapping operation to be performed upon the data words.

22. A method according to claim 21, wherein the DMA command specifies a portion of the memory that is double-word aligned, and wherein the plurality of bits designating the byte swapping operation comprise the two least significant bits of the length portion.

* * * * *